United States Patent [19]

Swartzmiller et al.

[11] Patent Number: 5,334,657

[45] Date of Patent: Aug. 2, 1994

[54] THERMOFORMABLE, CHEMICAL RESISTANT POLYMER BLENDS

[75] Inventors: Steven B. Swartzmiller; Robert J. Donald; Jeffrey E. Bonekamp, all of Midland, Mich.

[73] Assignee: The Dow Chemical Company, Midland, Mich.

[21] Appl. No.: 971,921

[22] PCT Filed: Oct. 27, 1992

[86] PCT No.: PCT/US92/09091

§ 371 Date: Dec. 18, 1992

§ 102(e) Date: Dec. 18, 1992

[87] PCT Pub. No.: WO93/13168

PCT Pub. Date: Jul. 8, 1993

Related U.S. Application Data

[63] Continuation-in-part of Ser. No. 859,207, Mar. 27, 1992, abandoned, which is a continuation-in-part of Ser. No. 811,350, Dec. 20, 1991, abandoned.

[51] Int. Cl.$^5$ .............. C08L 25/10; C08L 23/02; C08L 23/08
[52] U.S. Cl. .................. 525/71; 525/240; 525/86; 525/95; 525/98; 525/241
[58] Field of Search ............ 525/240, 71, 86, 95, 525/98, 241

[56] References Cited

U.S. PATENT DOCUMENTS

| | | | |
|---|---|---|---|
| 3,862,880 | 1/1975 | Feldman | 161/160 |
| 4,188,432 | 2/1980 | Holden et al. | 428/35 |
| 4,386,187 | 5/1983 | Grancio et al. | 525/96 |
| 4,386,188 | 5/1983 | Grancio et al. | 525/96 |
| 5,055,525 | 10/1991 | Henton et al. | 525/66 |

FOREIGN PATENT DOCUMENTS

| | | |
|---|---|---|
| 0004685 | 10/1979 | European Pat. Off. |
| 0042153 | 12/1981 | European Pat. Off. |
| 0060524 | 9/1982 | European Pat. Off. |
| 0060525 | 9/1982 | European Pat. Off. |
| 0125277 | 11/1984 | European Pat. Off. |
| 0147089 | 7/1985 | European Pat. Off. |
| 0402340 | 12/1990 | European Pat. Off. |

Primary Examiner—James J. Seidleck
Assistant Examiner—W. R. H. Clark
Attorney, Agent, or Firm—Douglas N. Deline; James B. Guffey

[57] ABSTRACT

A thermoformable chemical resistant polymer blend, useful in the preparation of refrigerator and freezer liners comprising:

A) from 45 to 70 parts by weight impact modified monovinylidene aromatic polymer, comprising from 1 to 25 weight percent of a rubber and 75 to 99 weight percent of a monovinylidene aromatic polymer matrix having a molecular weight (Mw) from 50,000 to 400,000, said weight percents being based on the total weight of said impact modified, vinylaromatic polymer;

B) from 15 to 40 parts by weight of an olefin polymer, selected from the group consisting of homopolymers of ethylene or propylene and copolymers of ethylene with one or more $C_{4-8}$ α-olefins; and C) from 5 to 25 parts by weight of a compatibilizing polymer, adapted to increase interfacial adhesion between components A) and B), components A) and B) or components A), B) and C) existing in said blend as co-continuous phases, and the sum of A), B) and C) being 100 parts.

9 Claims, No Drawings

THERMOFORMABLE, CHEMICAL RESISTANT POLYMER BLENDS

This application is a continuation-in-part of our prior application Ser. No. 07/859,207 (filed Mar. 27, 1992 and now abandoned) which was itself a continuation-in-part of our earlier application Ser. No. 07/811,350 (filed Dec. 20, 1991 and now abandoned.

The present invention relates to a thermoplastic resin composition having high resistance to attack by chemicals such as halogenated hydrocarbons and especially hydrochlorofluorocarbons (HCFC's) and good sheet thermoforming characteristics. More particularly, the present invention relates to such a composition and to thermoformed objects therefrom, such as refrigerator or freezer liners. In a further embodiment the present invention relates to structures comprising such thermoformed articles having adhered to one surface thereof a polyurethane foam, especially such a foam prepared by the use of hydrochlorofluorocarbon blowing agents.

It is previously known in the art to prepare thermoformable sheets from thermoplastic resins such as impact modified polystyrene (HIPS) and impact modified styrene acrylonitrile (ABS) resins. Such thermoformable resins have found wide use in the preparation of numerous objects such as containers, toys, and appliance components. In particular, refrigerator or freezer liners are often thermoformed from such a sheet material. In the manufacture of a typical refrigerator or freezer such a liner is placed into an outer jacket formed of metal or similar material that forms the outer cabinet or door of the refrigerator or freezer, and the space between the outer jacket and the liner is filled with a thermosetting foam, usually polyurethane foam. Typically polyurethane foams are prepared by blending a polyurethane forming mixture comprising a polyhydroxyl compound and a polyisocyanate compound with a suitable blowing agent and allowing the viscous liquid mixture to expand due to the effects of the blowing agent while the reaction to form the polyurethane takes place. By injecting the polyurethane forming mixture in the free space between the refrigerator or freezer liner and the outer jacket, and allowing the mixture to foam in place, a unitary structure is formed that greatly aids in the rigidity of the resulting refrigerator or freezer. Varying degrees of adhesion between the polyurethane foam and the liner may be obtained during the foaming process.

A number of chemicals are suitably employed as blowing agents, especially halogenated hydrocarbons, many of which are aggressive solvents for vinyl aromatic polymers. Recently, hydrochlorofluorocarbon (HCFC) and hydrofluorocarbon (HFC) blowing agents have been employed in a number of applications due to the reduced environmental degradation believed to result from releasing such blowing agents to the environment. However, HCFC and HFC blowing agents (also referred to as soft blowing agents), particularly HCFC 123 ($CCl_2HCF_3$), HCFC 141-b ($CCl_2HCH_2F$), HCFC 22 ($CHClF_2$), HFC 134a ($CF_3CH_2F$), and HFC 152a ($CH_3CHF_2$), have been found to be highly aggressive solvents with respect to many thermoplastic resins, particularly styrene containing resins, typically employed in thermoforming compositions. Due to this increased solubility, greater chemical attack of the thermoplastic resin can result if HCFC blowing agents come in contact with the surface of such thermoformable resin during the manufacturing process or while in use. This can lead to blistering and/or cracking of the thermoplastic resin due to the chemical attack at the point of contact with the thermoformed sheet.

Attempts to overcome such aggressive attack by compounds on typical thermoformable sheet materials have included use of an intervening barrier layer which may be coextruded or heat laminated to the thermoformable sheet material. Disadvantageously such film layer adds expense to the resulting thermoformable structure and often is cut or abraded during the manufacturing process thereby losing its barrier properties. Other solutions, such as coatings, similarly have not proven acceptable. Special resins which have improved resistance to the effects of HCFC's have also been attempted, but often such resins possess poor thermoformability, inadequate strength, inability to include reground scrap material from the manufacturing process, high cost or other unacceptable property.

For example, U.S. Pat. No. 4,386,187 discloses a resin blend having improved chemical resistance, however, it has now been discovered that such resins as are disclosed by this reference are not continuous in the vinylaromatic polymer phase and demonstrate poor thermoformability and insufficient flexural modulus and other physical properties for applications such as refrigerator or freezer liners.

Accordingly it would be desirable if there were provided a thermoformable, thermoplastic resin having improved resistance to attack by halogenated hydrocarbons, especially hydrochlorofluorocarbons, while maintaining tensile modulus, and other strength properties.

In addition it would be desirable if there were provided a sheet material comprising such a thermoformable thermoplastic resin.

It would further be desirable if there were provided a refrigerator or freezer liner thermoformed from such a thermoplastic resin.

Finally, it would be desirable if there were provided a refrigerator or freezer comprising the above liner.

According to the present invention there is provided a thermoformable polymer blend that is resistant to the solvent effects of halogenated hydrocarbons comprising:

A) from 45 to 70 parts by weight, preferably 50 to 60 parts by weight, most preferably 50.1 to 59.9 parts by weight, of an impact modified monovinylidene aromatic polymer, comprising from 1 to 25 weight percent of a rubber and 75 to 99 weight percent of a monovinylidene aromatic polymer matrix having a weight average molecular weight (Mw) from 50,000 to 400,000, said weight percents being based on the total weight of said impact modified, vinylaromatic polymer;

B) from 15 to 40 parts by weight, preferably 25 to 40 parts by weight, most preferably 30.1 to 39.9 parts by weight, of an olefin polymer, selected from the group consisting of homopolymers of ethylene or propylene and copolymers of ethylene with one or more $C_{4-8}$ α-olefins; and C) from 5 to 25 parts by weight, preferably 5 to 15 parts by weight, of a compatibilizing polymer, adapted to increase interfacial adhesion between components A) and B); components A) and B) or components A), B) and C) existing in said blend as co-continuous phases, and the sum of A), B) and C) being 100 parts.

Further according to the present invention there is provided a thermoformable sheet material comprising the foregoing thermoformable, polymer blend.

In addition according to the present invention there is provided a thermoformed article made by thermoforming the foregoing thermoformable polymer blend.

According to the present invention there is further provided a laminated article having a cross-sectional structure comprising a layer which is the foregoing thermoformed article, having adhered to at least one surface thereof a polyurethane foam layer. Desirably the exposed surface of such laminated article shows no detrimental effect even where the polyurethane foam is prepared utilizing a hydrochlorofluorocarbon blowing agent.

Furthermore, according to the present invention there is provided a refrigerator or freezer liner comprising the laminated article as above described.

Finally, according to the present invention there is provided a refrigerator or freezer comprising the above described liner.

Suitable impact modified, monovinylidene aromatic polymers include rubber modified homopolymers of $C_{6-20}$ monovinylidene aromatic monomers, copolymers of two or more such monomers and copolymers of one or more such monomers with up to 25 weight percent of a copolymerizable comonomer other than a monovinylidene aromatic monomer. Examples of suitable monovinylidene aromatic monomers are styrene, vinyl toluene, α-methyl styrene, t-butyl styrene, chlorostyrene, etc. Examples of suitable copolymerizable comonomers other than a monovinylidene aromatic monomer are N-phenyl maleimide, acrylamide, maleic anhydride, acrylic acid, n-butyl acrylate, methyl methacrylate, etc.

Suitable rubbers used to modify the impact properties of the foregoing monovinylidene aromatic polymers are those having Tg less than 0° C., preferably less than 20° C. Examples of suitable rubbers are homopolymers of $C_{4-6}$ conjugated dienes, especially butadiene or isoprene; copolymers of one or more monovinylidene aromatic monomers and one or more $C_{4-6}$ conjugated dienes, especially butadiene or isoprene; copolymers of ethylene and propylene or ethylene, propylene and a nonconjugated diene, especially 1,6-hexadiene or ethylidene norbornene; homopolymers of $C_{4-6}$ alkyl acrylates; copolymers of $C_{4-6}$ alkyl acrylates and a copolymerizable comonomer, especially a monovinylidene aromatic monomer or a $C_{1-4}$ alkyl methacrylate. Also included are graft polymers of the foregoing rubbery polymers wherein the graft polymer is a monovinylidene aromatic polymer. A preferred monovinylidene aromatic monomer for use in all of the foregoing rubbery polymers is styrene. A most preferred rubbery polymer is polybutadiene or a styrene/butadiene copolymer. The above rubbers may be prepared by anionic solution polymerization techniques or by free radically initiated solution, mass, emulsion or suspension processes. The rubbery elastomers prepared by emulsion polymerization may be agglomerated to produce larger particles having a bimodal or trimodal, etc. particle size distribution if desired.

Impact modified monovinylidene aromatic polymers are well known in the art and are readily commercially available. Suitable impact modified polymers are prepared by blending the rubbery polymer with previously prepared matrix polymer having the desired chemical composition, by graft polymerizing the matrix in the presence of a predissolved rubber, or by a combination of such techniques.

Preferred impact modified monovinylidene aromatic polymers are prepared by dissolving the rubber in the monomer or monomers, optionally in the presence of a solvent or diluent and polymerizing the resulting solution, desirably while agitating the solution so as to prepare a dispersed, grafted, impact modified polymer, having rubbery domains containing occlusions of matrix polymer dispersed throughout the resulting polymeric matrix. Such rubber modified polymers, known as mass or solution polymerized, high impact polymers, are previously well known in the art and are commercially available. Additional quantities of rubbery polymer, especially emulsion grafted rubbery polymers may be blended into the impact modified monovinylidene aromatic polymer if desired.

A highly preferred monovinylidene aromatic monomer is styrene and the impact modified polymer is high impact polystyrene. A very highly preferred, high impact polystyrene is prepared by the solution or mass polymerization technique and contains from 5 to 15 (more preferably from 6 to 9) weight percent polybutadiene rubber. Most highly preferred high impact polystyrenes are those wherein the polystyrene matrix has a molecular weight from 60,000 to 225,000 (preferably from 100,000 to 225,000 and more preferably from 150,000 to 225,000). When measuring such molecular weights, the technique employed is that of gel permeation chromatography employing a polystyrene standard.

In certain especially preferred embodiments hereof, it has been found to be particularly advantageous to employ high impact polystyrene (HIPS) of a sort which has a broadly distributed range of different sized polystyrene-grafted rubber particles dispersed therein. Such material may, for example, have a very broad or relatively flat rubber particle size distribution wherein the dispersed rubber particles individually range in size from 0.1 micron to 8 or 10 micron or more and wherein the total amount by weight of rubber contained within such HIPS material is more or less evenly (or randomly) distributed throughout the entire size range indicated. On the other hand, said broad particle size distribution may instead take the form of either a broad monomodal distribution or a multi-modal (for example, bimodal, trimodal, etc.) distribution within the above-noted broad size distribution range.

As is well known, in the case of a typical monomodal distribution a predominant portion by weight or volume of the dispersed rubber particles are located or concentrated at or around a particular peak size within the above-specified range and the weight or volume percentage of particles contained in the other portions of the entire size range incrementally diminish as one proceeds from said peak particle size toward either end of the overall size range.

As is also well known, multi-modal particle size distributions are typified by two or more distinct peaks being discernible in the overall particle size distribution (that is, when the entire particle population is plotted either by number fraction, weight fraction or volume fraction as a function of size over the entire size range in question).

One particular type or category of HIPS resin of special interest for use herein are HIPS resins which have a bimodal particle size distribution wherein the majority (for example, from 55 to 95, preferably from 70 to 90 and more preferably from 80 to 90 weight percent) of the dispersed rubber particles have a cellular occlusion morphology and in combination have a volume average particle size (and form a volume-based particle size distribution peak) in the range of from 1.0 to 2.5 micron and wherein a minority of the dispersed rubber particles (for example, from 5 to 45, preferably from 10 to 30 and more preferably from 10 to 20 weight percent) have a substantially solid non-occluded morphology and form a particle size distribution peak or mode in the range of from 3 to 8 micron. Exemplary of this type of high impact polystyrene resin is Styron TM 484 which is available from The Dow Chemical Company.

Another specific category of HIPS resin which is beneficially employed herein, particularly in the context of inorganic filler-containing (for example, talc-filled) polymer blend systems, is another one which has a bimodal particle size distribution but which has a substantially smaller overall average particle size, in this latter type of HIPS resin, a predominant portion by weight (for example, from 65 to 99, preferably from 70 to 95 and more preferably from 80 to 95 weight percent) of the dispersed rubber particles individually have a particle size in the range of from 0.1 to 0.8 (preferably from 0.2 to 0.6 and more preferably from 0.2 to 0.4) micron and collectively form a volume fraction-based particle size distribution peak within the above-stated size range. The remaining portion (for example, from 1 to 35, preferably from 5 to 30 and more preferably from 5 to 20 weight percent) of the dispersed rubber particles in such HIPS resin individually have particle sizes which are 1 micron or more (but typically less than 10 micron) and collectively form a volume fraction-based size distribution peak in the 1.1 to 8 (preferably 1.2 to 3 and more preferably 1.2 to 2.5) micron size range.

The relatively smaller sized dispersed rubber particles of this latter HIPS resin can have either a single occlusion (that is, polystyrene core and rubber shell) type of particle morphology or can instead be of the multiple occlusion (for example, cellular) variety. However, it will typically be of the single occlusion type, particularly in those instances wherein the volume average size of the indicated small particle fraction is in the 0.1 to 0.6 (especially 0.2 to 0.5) micron size range. On the other hand, the relatively larger size portion of the particular HIPS resin's dispersed rubber particles will typically be of the multiple occlusion/cellular variety. One exemplary HIPS resin of this latter type is available from The Dow Chemical Company as XU 70007.

In one particularly beneficial embodiment of the present invention, both of the above-described types of bimodal HIPS resins are employed in combination with each other to provide what is essentially a trimodal HIPS formulation. When so employed, the resulting formulation can be generally characterized as having a substantial population (for example, from 15 to 92, preferably 25 to 85, more preferably from 30 to 80 and most preferably from 50 to 70 weight percent on a total rubber content weight basis) of relatively small sized (for example, 0.1 to 0.8 or 1, preferably 0.2 to 0.6 and more preferably 0.2 to 0.4 micron) grafted rubber particles (preferably having a single occlusion structure) in combination with (a) from 5 to 80 (preferably 10 to 70, more preferably from 10 to 60 and most preferably from 20 to 45) weight percent (on a rubber weight basis) of medium sized (for example, from 1.2 to 3 and preferably from 1.2 to 2.5 micron) particles, typically having a cellular morphology, and (b) from 2 to 20 (preferably from 4 to 15 and more preferably from 5 to 10) weight percent of large sized particles in the greater than 3 up to 10 (especially the 4 to 8) micron size range.

When such trimodal HIPS resins are prepared by blending the above-described separate bimodal HIPS resins, the indicated very large grafted rubber particle component will have a relatively dense, non-occluded rubber morphology of the sort which has been noted above. However, as will be readily apparent to those skilled in this art, such large particle grafted rubber component can alternatively be prepared by known, conventional means so as to have a highly occluded cellular morphology or structure.

In those instances wherein it is desired to employ a trimodal HIPS resin ingredient and wherein it is desired to obtain such ingredient by blending or compounding separately prepared bimodal HIPS resins of the types described above, the individual small size/medium size and medium size/large size bimodal HIFIS blendstock resins can typically be blended in a 10:90 to 90:10 weight ratio relative to each other but will preferably be blended in a 20:80 to 80:20 (more preferably 25:75 to 75:25 and most preferably 35:65 to 65:35) weight ratio.

Suitable olefin polymers for use herein include high and low density polyethylenes as well as linear low density polyethylene, for example, copolymers of ethylene and one or more $C_{4-8}$ $\alpha$-olefins. A preferred olefin polymer is high density polyethylene having a density from .945 to .970, more preferably from .955 to .965. Such high density polyethylene resins are preferred due to the stiffness which they impart to the final, thermoformable, resin blend. It is preferred that the olefin polymer have a melt viscosity, which is matched, or nearly matched to that of the monovinylidene aromatic resin, thereby enabling the resulting blend to achieve thorough melt mixing due to high shear stresses between the components and appropriate phase domain size reduction. Preferred are the use of monovinylidene aromatic polymers and olefin polymers having viscosities at the temperature of blending wherein the ratio of $V_{VA}:V_{OP}$ is from 1:10 to 1:0.05, more preferably from 1:2.0 to 1:0.1. In the foregoing formula $V_{VA}$ is the vinylidene aromatic polymer melt viscosity and $V_{OP}$ is the olefin polymer melt viscosity. Such melt viscosities are measured by dynamic mechanical spectroscopy at a shear rate of 0.1 sec$^{-1}$. Phase domain size is also affected by the amount of compatibilizing polymer employed, in addition it has now been discovered that appropriate domain sizes cannot be attained utilizing blends containing ratios of components outside of the previously mentioned percentages of A), B) and C).

Phase domain size can be measured by the technique of Computerized Image Analysis as disclosed in Russ, John C., *Computer Assisted Microscopy, the Measurement and Analysis of Images*, Plenum Press, New York, NY,(1990). Desirably the respective domains, that is, the monovinylidene aromatic polymer domain and olefin polymer domain are continuous, at least in part, in three dimensions, and have a maximum cross-sectional size from 0.1 to 3, preferably 0.2 to 1.0 $\mu$M. By the term, "continuous, at least in part", is meant that some or all domains may terminate without spanning the entire article in the direction indicated, however, a substantial quantity of domains, preferably at least 25 percent, extend for a distance of at least 100 times the above maximum cross-sectional area. If substantial amounts of larger domain sizes are present, the monovinylidene aromatic polymer may absorb sufficient solvent, especially hydrochlorofluorocarbons or other blowing agents that blisters may form under some conditions. That is, sufficient solvent can be absorbed by the monovinylidene aromatic domain such that upon heating, the trapped solvent volatilizes in sufficient volume to form a void or blister within the polymer, or the solvent otherwise adversely affects the polymeric sheet.

In a further embodiment it is desirable that the crystalline melting point of the olefin polymer be less than the thermoforming temperature of the monovinylidene aromatic polymer. Monovinylidene aromatic polymers are known to be highly amenable to thermoforming due to the fact that such polymers exhibit a melt rheology over a range of temperatures (referred to as the rubbery Plateau or thermoforming range) such that the viscous and elastic properties of the melt are properly balanced for good thermoformability. Below such temperature the polymer melt has an excessive elastic modulus and the polymer retains a "memory" permitting excessive snap back after forming of the desired thermoformed shape. Above this temperature, the melt possesses insufficient elastic modulus, and parts experience shear thinning during thermoforming. Thus it is necessary that at the thermoforming temperature of the monovinylidene aromatic polymer, the olefin polymer no longer retains a crystalline structure or otherwise excessively affects thermoforming properties of the monovinylidene aromatic polymer. That is, the crystalline melting point, $T_c$, of the olefin polymer must be less than the thermoforming range of the monovinylidene aromatic polymer. Because the resin blend is co-continuous in both components A) and B) the aforementioned thermoforming properties are apparent in the resin blend. If the monovinylidene aromatic polymer is not co-continuous, satisfactory thermoforming properties are unattainable. Preferably the thermoforming range of the polymer blend is from 130° to 170° C., more preferably from 135° to 160° C. In addition, it is desirable that the olefin polymer possess sufficient crystallinity in the blend to produce the desired chemical resistance to the hydrochlorofluorocarbon blowing agents. Suitable olefin polymers for use herein are HDPE 12065 and HDPE 62013, available from The Dow Chemical Company.

The compatibilizing polymer is a polymer, or mixture of polymers, believed to have the ability to reduce interfacial surface tension between the monovinylidene aromatic polymer and the olefinic polymer. As such, the compatibilizing polymer may be thought of as a polymeric surfactant, having a portion thereof that is compatible with the monovinylidene aromatic polymer and another portion that is compatible with the olefinic polymer. Accordingly, the compatibilizing polymer preferentially resides at the interface between the cocontinuous phases. Suitable compatibilizing polymers are readily determined by preparing a blend of components A) and 8) and comparing the physical properties, especially the impact resistance and ductility of such blend, with a similar blend containing the compatibilizing polymer. Satisfactory compatibilizing polymers produce an increase in both impact resistance and ductility. Preferably such increase in both properties is at least 10 percent, more preferably 20percent. Desirably, such polymers are elastomers, that is, polymers having a $T_g$ less than 0° C., preferably less than −20° C., having weight average (Mw) and number average (Mn) molecular weights of from 10,000 to 150,000,more preferably from 20,000 to 100,000, and most preferably from 50,000 to 100,000 as determined by gel permeation chromatography using a polystyrene standard.

Preferred compatibilizing polymers are elastomeric polymers containing a monovinylidene aromatic monomer and a monomer other than a monovinylidene aromatic monomer, especially a $C_{2-18}$ α-olefin or conjugated or nonconjugated diolefin. Especially preferred are thermoplastic, elastomeric block copolymers of one or more monovinylidene aromatic monomers and one or more $C_{4-6}$ conjugated dienes. Such block copolymers include diblock, triblock, multiblock and radial block copolymers whether tapered, partially tapered (that is, tapered between less than all blocks) or hydrogenated, and mixtures of the foregoing. A most preferred compatibilizing polymer is a triblock copolymer or hydrogenated triblock copolymer of the monovinylidene aromatic monomer or monomers employed in component A), and either butadiene, isoprene or a mixture thereof. Thus for use in high impact polystyrene containing blends, the preferred compatibilizer is a styrene/butadiene or styrene/isoprene triblock copolymer, containing 25–45 (preferably 30 to 45, more preferably 35 to 45 and most preferably 40 to 45) weight percent styrene. One such preferred block copolymer for use herein is Vector ™ 6240D, available from Dexco Polymers. Another preferred block copolymer for use herein is a styrene/isoprene/styrene triblock copolymer which contains from 42 to 44 weight percent styrene and 56 to 58 weight percent isoprene and which has a weight averaged molecular weight (Mw) of 89,000 and a number average molecular weight (Mn) of 86,000. These and other block copolymers suitable for use herein will typically have a fairly narrow molecular weight distribution, with the Mw: Mn ratio thereof typically being in the range of from 1.0 to 1.3 (preferably from 1.0 to 1.2 and more preferably from 1.0 to 1.1).

The polymer blend is prepared by combining the foregoing components and, optionally, additional additives such as colorants, pigments, antioxidants, flow aids, reinforcing agents such as talc, fiberglass, and carbon fibers, nucleators, blowing agents, and lubricants. The mixture is thoroughly melt blended by use of an extruder or similar, intensive mixing device.

In one preferred embodiment, the polymer blend compositions of the present invention further comprises talc as an additional non-polymeric blend ingredient. When so employed, the talc ingredient used typically is one which has a number averaged particle size of from 0.1 to 5 (preferably from 0.1 to 2 and more preferably from 0.1 to 1) micron (based on the averaged or normalized size of the individual, typically irregularly shaped talc particles) and is generally employed in an amount corresponding to from 1 to 20 (preferably from 3 to 15, more preferably from 4 to 12 and most preferably from 5 to 10) weight percent on a total polymer blend composition weight basis. In connection with this particular preferred embodiment, it has also been found to be significantly preferred and advantageous to prepare said talc-filled blend compositions by precompounding the talc with at least a portion of the olefin polymer component as opposed to either precompounding same with the impact modified monovinylidene aromatic polymer or directly adding the talc as a free-standing, separate ingredient when melt blending said olefin polymer and aromatic polymer components to form the subject polymer blends. While it is certainly possible, acceptable and within the scope of the present invention to incorporate the talc in either of these latter fashions, it has nonetheless been found, however, that distinctly superior toughness and processing characteristics (for example, extrusion and thermoforming) are obtained for the talc-filled blends in question when the former talc incorporation methodology (that is, either precompounding the talc with all of the polyolefin blend component or use of polyolefin-based talc concentrate) is instead employed.

In another preferred embodiment, it has also been found to be advantageous to incorporate certain added thermal stabilizers (that is, beyond those that are conventionally employed in commercial versions of the individual polymer blend ingredients) within the subject polymer blend compositions. Thermal stabilizers which have been found to be particularly beneficial in this regard both individually and especially in combination with each other are hindered phenol stabilizers such as Irganox 1010 and phosphite stabilizers such as trisnonyl phenyl phosphite. The indicated hindered phenol stabilizers are preferably employed in an amount ranging from 0.1 to 0.5 (more preferably from 0.2 to 0.3) weight percent on a total composition weight basis. The phosphite stabilizers, on the other hand, are preferably used in an amount ranging from 0.4 to 1.1 (more preferably from 0.5 to 1.0) weight percent on a total composition weight basis. Most preferably, the indicated phosphite and hindered phenol stabilizers are used in combination with each other, with each of them being used in their above-stated, individual preferred concentration ranges.

In the absence of the compatibilizing polymer the monovinylidene aromatic polymer and olefinic polymer form segregated domains and the composition demonstrates the worst properties of both polymers, lacking both impact resistance, chemical resistance and thermoformability. However, according to the present invention, co-continuous phases of the monovinylidene aromatic polymer and olefinic polymer result because the interface between the two phases contains a significant amount of the compatibilizer. This is believed to permit interfacial adhesion, giving the blend greater ductility, impact resistance, and environmental stress crack resistance. Also, surface properties, thermoformability and appearance of the blend are greatly improved. Because the compatibilizer is believed to preferably occupy the volume between the domains of the other two polymers, component C) can also be thought of as being cocontinuous, at least in part.

However, it should be noted that excessive quantities of the compatibilizer may lead to a reduction in resin physical properties, especially tensile modulus. Desirably the blend exhibits a tensile modulus of at least 650 MPa, more preferably at least 1,000 MPa. Preferred amounts of compatibilizer polymer are from 7 to 15 parts by weight.

It will be readily appreciated by the skilled artisan that additional polymer components may be incorporated into the present blend, if desired, without departing from the scope of the present invention so long as the desired objectives disclosed herein are not lost.

Thermoformable sheets of the thermoplastic blend of the present invention are readily prepared utilizing techniques well known in the prior art. Suitably, the molten polymer blend prepared according to the previously described melt blending process, or prepared by remelting and re-extruding pellets thereof, is forced through a dietoformathin sheet. The sheet is subsequently passed through a thermoforming process (optionally after reheating if the sheet has been cooled below the thermoforming temperature) wherein the desired shape is pressed into the hot, nearly molten sheet. A desirable temperature range for thermoforming is from 130° to 170° C. Suitable thermoforming techniques are well known to the skilled artisan and disclosed, for example, in the *Encyclopedia of Polymer Science and Engineering, 2nd ed.*, Wiley-Interscience, vol, 16, 807–832 (1989).

In a further desirable feature of the present invention, scrap material resulting from the preparation of the thermoformable sheet or from thermoformed articles, such as edge material which is cut from the sheets or articles, may be readily remelted and included in the thermoplastic blend without adverse effect on polymer properties. In a further embodiment it may be desirable to improve surface properties of the thermoformable sheet, particularly the gloss of such sheet, by lamination or coextrusion of a high gloss film to the surface to be ultimately exposed. Suitable high gloss films include extruded polystyrene or styrene/acrylonitrile films. These films may be laminated to the thermoformable sheet surface by heat sealing, use of adhesives, or by coextrusion techniques.

Although the thermoformed articles prepared from the polymer blends according to the present invention may be employed in any application, such as in containers, toys, furniture, and automotive components, they are desirably employed in the preparation of refrigerators and freezers. More particularly the present, one-piece thermoformed article is utilized as a refrigerator or freezer liner to form the inner surface of the door or body of the refrigerator or freezer.

Having described the invention the following examples are provided as further illustrative and are not to be construed as limiting. Unless stated to the contrary all parts and percentages are based on weight.

EXAMPLES 1–2 AND COMPARATIVE

Various blends of high impact polystyrene (Styron ™ 484), high density polyethylene (HDPE 12065 available from The Dow Chemical Company) and a 100 percent styrene/butadiene/styrene triblock copolymer containing 42 percent styrene (Vector ™ 6240D available from Dexco Polymers) were prepared. Sheet samples measuring 12.0 in ×19 in ×130 in (305 mm ×483 mm ×3.3 mm) were extruded on a sheet extrusion line at a melt temperature of 400° F. (204° C.). The sheet samples were thermoformed into tubs approximately 6 in (1 52 mm) deep ×6.5 in (165 mm) wide ×12.5 in (317 mm) long further having indentations 4 in ×0.75 in × 375 in (101 mm ×19 mm ×9.5 mm) extending from the bottom surface of the tub. Thermoforming properties were noted and are reported in Table 1. The bottom sections of the tubs were separated and placed inside molds. A polyurethane foam using HCFC-123 blowing agent was foamed around the tub sections.

The resulting foam/sheet composites were heated to 140° F. (60° C.) for 24 hours and then cooled to −40° F. (−40° C.) for 24 hours. This procedure was repeated one more time. After thermal cycling the composites were evaluated for HCFC induced blistering. Results are contained in Table 1.

TABLE 1

| Ex. | Composition Percent | | | Thermoforming Properties[1] | Blistering |
|---|---|---|---|---|---|
| | HIPS | PE | SBS | | |
| 1 | 66 | 24 | 10 | excellent | few[2] |
| 2 | 56 | 34 | 10 | excellent | none |
| Comp. 1 | 46 | 44 | 10 | fair | none |

TABLE 1-continued

| Ex. | Composition Percent | | | Thermoforming Properties[1] | Blistering |
| --- | --- | --- | --- | --- | --- |
| | HIPS | PE | SBS | | |
| Comp. 2 | 26 | 64 | 10 | poor | — |

[1]Excellent - no observed thinning of drawn parts Fair - some thinning of drawn parts Poor - not suitable for thermoforming
[2]Only a few small cosmetic blisters on foam side of sheet, not visible from opposite side of thermoformed sheet.

EXAMPLES 3-6

Various blends of two different high impact polystyrene resins (Styron ™ 484 and XU 70007 and mixtures thereof) with high density polyethylene (HDPE 12065) and an elastomeric styrene/butadiene/styrene triblock copolymer were prepared by conventional melt blending techniques in a Welding Engineers twin screw extruder operating to produce a melt temperature of 220° C. Samples were then extruded at about 210° C. into 100 mil thick sheet using a Davis-Standard sheet extrusion line.

Test specimens were prepared from each of the resulting polymer blends and were subjected to physical property testing.

The specific compositional details of the various polymer blends and the physical property testing results associated therewith are summarized in Table 2 below.

In the Table 2 compositions, it can be noted that Example 6 is the same as Example 3 in respect to its individual polymer components and ratios but differs from Example 3 by virtue of containing (on a total weight basis) 0.25 weight percent of a hindered phenol stabilizer and 0.75 weight percent of a phosphite stabilizer compounded therein.

TABLE 2

| | Example Number | | | |
| --- | --- | --- | --- | --- |
| | 3 | 4 | 5 | 6 |
| Blend Components (wt. percent) | | | | |
| HIPS-1 (Styron ™ 484) | 56 | 28 | 0 | 55.58 |
| HIPS-2 (XU-70007) | 0 | 28 | 56 | 0 |
| HDPE | 34 | 34 | 34 | — |
| SBS (Vector ™ 6240D) | 10 | 10 | 10 | — |
| Hindered Phenol Stabilizer | 0 | 0 | 0 | 0.25 |
| Phosphite Stabilizer | 0 | 0 | 0 | 0.75 |
| Properties | | | | |
| Flex Fatigue[1] number of blends | 3.1 | 13.1 | 2.4 | 3.7 |
| Notched Izod[2] (T.D.*) | 1.9(102) | 2.7(144) | 2.6(139) | 2.2(118) |
| Notched Izod[2] (M.D.**) | 3,4(182) | 4.8(257) | 7.2(385) | 3.7(198) |
| Percent Elongation at Break (T.D.) | 42 | 45 | 21 | 48 |
| Tensile Modulus[3] (T.D.) | 117(807) | 133(917) | 148(1,021) | 116(800) |
| Tensile Modulus[3] (M.D.) | 174(1,200) | 181(1,248) | 195(1,345) | 161(1,110) |
| Tear Strength[4] | Easy | More Difficult | Very Difficult | Easy |
| Dynatup PE[5] | 57(6.4) | 120(13.5) | 118(13.3) | 126(14.2) |
| Ductility Index[6] | 3(0.34) | 67(7.6) | 61.(6.9) | 16(1.8) |

*TD means transverse direction. Sample is cut from sheet in the direction transverse to the direction of extrusion.
**MD means machine direction. Sample is cut in the direction of extrusion.
[1]Flex Fatigue Test - A 100 mil thick, ¼ inch wide transverse cut sample is bent 180° and pushed flat as a first bend. Next the sample is bent 360° and again pushed flat as a second bend. The 360° bends are then continued (being pushed flat in each instance) until failure occurs. The test is then repeated to obtain a sample population of 21 data points from which a mean value is calculated.
[2]ASTM D256 using a 0.91 Kg hammer in ft. lbs./in. (J/m).
[3]ASTM D638 at 0.51 cm/min. rate in 1,000 psi units (MPa).
[4]Tear Strength is determined by tearing a 100 mil thick sheet by hand in the machine direction to subjectively determine how difficult it is to tear and a comparative judgement or value is assigned.
[5]Instrumented Dart Impact Testing is done pursant to ASTM D3763 using a Dynatup instrument with a 52 lb weight and a dart diameter of 0.5 in (1.27 cm) and using a 2 square inch (25.8 cm²) plaque sample and an impact speed of 8,000 inches/minute. Peak Energy (PE) then equals the energy at maximum load (i.e., the area under the load displacement curve at maximum load). Units are in. lb. (J). Total Energy (TE) equals the area under the total load displacement curve. Units are in. lb. (J).
[6]Ductility Index = Dynatup TE minus Dynatup PE. Units are in. lb. (J).

As can be seen from the results in Table 2, the blend composition prepared using a 50:50 weight ratio mixture of Styron ™ 484 and XU 70007 exhibited dramatically enhanced flex fatigue performance relative to that of the otherwise comparable blends which were prepared using either one of the individual HIPS resins separately.

As can also be seen, the inclusion of the additional thermal stabilizer ingredients in Example 6 substantially improved the overall toughness of the resulting composition as compared to that of Example 3.

EXAMPLES 7-10

In this series of Examples, various polymer blend compositions were prepared which were similar to Examples 3-5 above with the exception of (a) having 10 weight percent talc incorporated therein and (b) using a styrene/isoprene/styrene triblock copolymer (42-44 weight percent styrene and 56-58 weight percent isoprene; Mw = 89,000 and Mn 86,000) in place of the SBS copolymer. The physical properties of the resulting blends are set forth in Table 3 below.

TABLE 3

| | Example Number | | | |
| --- | --- | --- | --- | --- |
| | 7 | 8 | 9 | 10 |
| Blend Components (wt. percent) | | | | |
| HIPS-1 (Styron ™ 484) | 49.2 | 36.9 | 24.6 | 12.3 |
| HIPS-2 (XU 70007) | 0 | 12.3 | 24.6 | 36.9 |
| HDPE | 29.8 | 29.8 | 29.8 | 29.8 |

TABLE 3-continued

|  | Example Number | | | |
|---|---|---|---|---|
|  | 7 | 8 | 9 | 10 |
| SIS | 10 | 10 | 10 | 10 |
| Talc | 10 | 10 | 10 | 10 |
| Hindered Phenol Stabilizer | 0.25 | 0.25 | 0.25 | 0.25 |
| Phosphite Stabilizer | 0.75 | 0.75 | 0.75 | 0.75 |
| Properties | | | | |
| Flex Fatigue | 3.1 | 4 | 5.1 | 6 |
| Notched Izod (T.D.) | 2.1(112) | 2.4(128) | 2.5(134) | 2.7(144) |
| Notched Izod (M.D.) | 4.0(214) | 4.4(235) | 4.6(246) | 4.9(262) |
| Tensile Modulus (T.D.) | 133(917) | 150(1,034) | 160(1,103) | 167(1,152) |
| Flex Modulus* (T.D.) | 164(1,131) | 164(1,131) | 176(1,214) | 189(1,303) |
| Dynatup PE | 102(11.5) | 131(14.8) | 106(12.0) | 119(13.4) |
| Ductillity Index | 9(1.0) | 10(1.1) | 15(1.7) | 33(3.7) |

*ASTM D790 at 0.13 cm/min rate. Units are 1,000 pis (MPa).

As can be seen from the results in Table 3, the talc filled polymer blend compositions hereof become increasingly tougher as the proportion of the smaller particle sized HIPS resin (that is, XU 70007) is increased relative to that of its larger rubber particle-containing counterpart (that is, Styron ™ 484). It thus appears that improved toughness in talc-containing versions of the subject polymer blends is substantially improved by increasing the proportion (or population) of very small (for example, 0.2–0.6 micron) grafted rubber particles contained within such talc-filled blends.

EXAMPLES 11–14

In this series of examples, three different talc-filled polymer blends were prepared which had identical overall compositional make-up but which were prepared using different methods of incorporating the talc ingredient.

In one of the blends (Example 11) the talc was introduced to the compounding extruder as a concentrate in a HIPS carrier resin whereas in Example 12 it was directly added (that is, without being pre-compounded) and in Example 13 it was added in the form of a HDPE-based concentrate.

In addition, a fourth blend was also prepared (Example 14) which contained the same relative ratios of the same polymer ingredients but which did not contain the talc ingredient.

The physical properties obtained for the various blends prepared in the above-noted fashions are summarized in Table 4.

As can be seen from the results in Table 4, the blend prepared using a polyethylene-based talc concentrate (that is, Example 13) exhibits notably better notched Izod impact strength values than those obtained when the talc is either added directly to the melt compounding operation or added in the form of a HIPS resin-based concentrate. As can also be seen, the talc ingredient, regardless of how it is added, serves to substantially increase the modulus of the resulting polymer composition.

We claim:

1. A thermoformable polymer blend that is resistant to the solvent effects of halogenated hydrocarbons comprising:

A) from 50.1 to 59.9 parts by weight impact modified monovinylidene aromatic polymer, comprising from 1 to 25 weight percent of a rubber and 75 to 99 weight percent of a monovinylidene aromatic polymer matrix having weight average molecular weight (Mw) from 50,000 to 400,000, said weight percents being based on the total weight of said impact modified, monovinylidene aromatic polymer;

B) from 30.1 to 39.9 parts by weight of an olefin polymer, selected from the group consisting of homopolymers of ethylene and copolymers of ethylene with one or more C4- 8 α-olefins; and C) from 5 to 25 parts by weight of a compatibilizing polymer, adapted to increase interfacial adhesion between components A) and B), components A) and B) existing in said blend as co-continuous pha-

TABLE 4

|  | Example Number | | | |
|---|---|---|---|---|
|  | 11 | 12 | 13 | 13 |
| Blend Components (wt. percent) | | | | |
| HIPS-1 (Styron ™ 484) | 24.6 | 24.6 | 24.6 | 27.4 |
| HIPS-2 (XU 7007) | 24.6 | 24.6 | 24.6 | 27.4 |
| HDPE | 29.8 | 29.8 | 29.8 | 33.2 |
| SIS | 10 | 10 | 10 | 11.25 |
| Hindered Phenol Stabilizer | 0.25 | 0.25 | 0.25 | 0.25 |
| Phosphite Stabilizer | 0.75 | 0.75 | 0.75 | 0.75 |
| Talc Content | 10 | 10 | 10 | 0 |
| Talc Addition Method | HIPS Concentrate | Direct Add | Polyethylene Concentrate | |
| Properties | | | | |
| Notched Izod (T.D.) | 2.02(108) | 2.17(116) | 2.42(129) | 2.3(123) |
| Notched Izod (M.D.) | 3.55(190) | 3.76(201) | 4.50(241) | 5.3(283) |
| Percent Elongation at Break (T.D.) | 12 | 8.3 | 17 | 34 |
| Percent Elongation at Break (M.D.) | 93 | 100 | 116 | 80 |
| Flex Modulus (T.D.) | 210(1,448) | 165(1,138) | 182(1,255) | 134(924) |
| Flex Modulus (M.D.) | 252(1,738) | 230(1,586) | 237(1,634) | 202(1,395) | ses, and the sum of A), B) and C) being 100 parts; said compatibilizing polymer being an elastomeric styrene/butadiene/styrene or styrene/isoprene/styrene triblock copolymer having weight average (Mw) and number average (Mn) molecular weights of from 10,000 to 150,000 and containing from 25 to 45 weight percent styrene.

2. A thermoformable sheet material comprising a polymer blend according to claim 1.

3. A thermoformed article comprising a polymer blend according to claim 1.

4. The polymer blend of claim 1 wherein the rubber component of the impact modified monovinylidene aromatic polymer is dispersed within said aromatic polymer as discrete rubber particles individually ranging in size from 0.1 micron to 10 micron.

5. The polymer blend of claim 4 wherein the dispersed rubber particles of the impact modified monovinylidene aromatic polymer exhibit a bimodal particle size distribution within the 0.1 to 10 micron particle size range.

6. The polymer blend of claim 5 wherein from 55 to 95 weight percent of the dispersed rubber particles have a cellular occlusion morphology and, in combination, have a volume averaged particle size of from 1 to 2.5 micron and wherein from 5 to 45 weight percent of said dispersed rubber particles are composed of substantially non-occluded particles having a volume average particle size in the 3 to 8 micron range.

7. The polymer blend of claim 5 wherein from 65 to 99 weight percent of the dispersed rubber particles have diameters in the 0.1 to 0.8 micron range and wherein from 1 to 35 weight percent of said rubber particles have diameters in the 1 to 10 micron range.

8. The polymer blend of claim 4 wherein the dispersed rubber particles of the impact modified aromatic polymer exhibit a trimodal particle size distribution in which from 15 to 92 weight percent of said dispersed particles have diameters falling within the 0.1 to 0.8 micron size range; from 5 to 80 weight percent of said particles have diameters failing within the 1.2 to 3 micron size range; and from 2 to 20 percent of said particles have diameters falling within the greater than 3 to 10 micron size range.

9. The polymer blend of claim 1 wherein the elastomeric styrene/butadiene/styrene or styrene/isoprene/styrene triblock compatibilizing copolymer has weight average and number average molecular weights of from 20,000 to 100,000 and contains from 35 to 45 weight percent styrene.

* * * * *